United States Patent [19]

Vleggaar et al.

[11] Patent Number: 4,484,624
[45] Date of Patent: Nov. 27, 1984

[54] APPARATUS FOR TRANSFERRING HEAT BY MEANS OF HOLLOW FILAMENTS, AND ITS USE IN VARIOUS HEATING SYSTEMS

[75] Inventors: Jan Vleggaar, Doetinchem, Netherlands; Karl Ostertag; Klaus Schneider, both of Erlenbach, Fed. Rep. of Germany

[73] Assignee: Akzo nv, Arnhem, Netherlands

[21] Appl. No.: 390,807

[22] Filed: Jun. 22, 1982

Related U.S. Application Data

[63] Continuation of Ser. No. 92,078, Nov. 6, 1979, abandoned.

[30] Foreign Application Priority Data

Nov. 6, 1978 [NL] Netherlands .......................... 7811007

[51] Int. Cl.³ ............................ F28F 9/22; F28D 7/02
[52] U.S. Cl. ..................................... 165/172; 165/160; 165/163; 165/DIG. 8
[58] Field of Search ............... 165/163, 165, 180, 173, 165/1, 159, 156, 164, 169, 168, 172; 138/130, 144

[56] References Cited

U.S. PATENT DOCUMENTS

| | | | |
|---|---|---|---|
| 3,228,456 | 4/1969 | Brown et al. | 165/159 X |
| 3,239,000 | 3/1966 | Meagher | 165/180 X |
| 3,315,740 | 4/1967 | Withers | 165/165 |
| 3,335,790 | 8/1967 | Aranyi et al. | 165/163 |
| 3,419,069 | 12/1968 | Baker et al. | 165/180 X |
| 3,438,434 | 1/1966 | Smith | 165/159 |
| 3,489,209 | 1/1970 | Johnson | 165/180 |
| 4,248,062 | 2/1981 | McLain et al. | 138/30 X |

Primary Examiner—Sheldon J. Richter
Attorney, Agent, or Firm—Stevens, Davis, Miller & Mosher

[57] ABSTRACT

The invention relates to an apparatus for the transfer of heat by means of hollow filaments which extend in the form of a helix and/or a spiral and are provided in more than two layers. The apparatus may be made up of a multilayer winding. The outer diameter of the hollow filaments is preferably 0.05–1 mm and the wall thickness is 5–20% of the outer diameter. The invention also relates to the use of this heat exchanger in various heating systems.

5 Claims, 29 Drawing Figures

APPARATUS FOR TRANSFERRING HEAT BY MEANS OF HOLLOW FILAMENTS, AND ITS USE IN VARIOUS HEATING SYSTEMS

This is a continuation of application Ser. No. 092,078, filed Nov. 6, 1979, now abandoned.

The invention relates to an apparatus for the transfer of heat between at least two media by means of hollow filaments.

A heat exchanger of the type indicated above is known from Canadian Pat. No. 796 181. The known apparatus comprises a shell which accommodates an elongated bundle of parallel hollow synthetic filaments. The one medium flows through the filaments and the other medium flows through the shell around and between the hollow filaments, in such a way as is generally practiced in the case of the conventional heat exchangers comprising bundles of steel tubes.

Although under certain circumstances reasonable results may be obtained with such known heat exchangers comprising hollow filaments, the construction applied is insufficiently reliable because of the relatively high flexibility of the hollow filaments. The know heat exchanger is rather vulnerable, so that there is a change of leakage and unsatisfactory control of the throughflow, which as the price of energy rises will be more and more considered a disadvantage.

The invention has for its object to provide a heat exchanger of the type indicated in the opening paragraph which no longer displays the above-mentioned disadvantages. The heat exchanger according to the invention is characterized in the first place in that the hollow filaments extend in the form of a helix and/or a spiral and are provided in more than two layers. This makes it possible for a heat exchanger having a high efficiency and a high capacity to be accomodated in a relatively small space. A particularly compact and effective embodiment of the heat exchanger is characterized according to the invention in that the hollow filaments are provided in a number of layers, with the hollow filaments of each layer multiply crossing the hollow filaments of the next layers. The heat exchanger according to the invention can be particularly effectively be made up of a multilayer winding, which may have a circular, elliptical or polygonal, more particularly rectangular ring section having rounded corners. According to the invention the heat exchanger may be characterized in that the groups of hollow filaments are formed from woven fabric, a knitted fabric, a web or some other flat filaments pattern obtained by a laying process.

Another particularly compact heat exchanger which is simple to realize is characterized according to the invention in that a group of filaments forming a layer is so arranged that the hollow filaments placed next to each other in the group each extend in the form of flat spirals which lie in adjacent planes. The construction may then be such that the spiral form extends from the outside inwardly, and subsequently reverses to spirally extend from the inside outwardly or inversely.

The heat exchanger according to the invention may be with advantage be characterized then in that two or more groups of hollow filaments are provided which extend along spirals which are placed about each other. The hollow filaments used in the heat exchanger according to the invention have an outer diameter of 0.05 to 5 mm, but preferably of 0.05 to 1 mm. The wall thickness of the hollow filaments is 5–20% of the outer diameter. It is preferred that the wall thickness should be approximately 10% of the outer diameter.

The heat exchanger is characterized according to the invention in that the hollow filaments are formed from one or more of the following substances or mixtures thereof:

polyolefins, such as polyethylene, polypropylene and polyisobutylene;
polystyrene and copolymers (random, alternating and block) of styrene and butadiene, acrylonitrile and acrylate esters;
polyhaloolefins, such as polyvinyl chloride and polytetrafluoroethylene;
polyvinyls, such as polyvinyl alcohol and polyvinyl acetate;
polyacrylates and polymethacrylates, such as polymethylmethacrylate and polymethylacrylate and other polyacrylates;
polyacrylonitrile;
elastomers such as natural rubber, synthetic rubbers, for instance silicone rubbers or polyolefinic rubbers or copolymers of the ethylene-propylene rubber type (E P D M);
polyoxides, such as polypropylene oxide and poly-2,6-dimethylphenylene oxide;
saturated and unsaturated polyesters, such as polyethylene terephthalate;
polyamides, such as nylon 6, nylon 66 and aromatic polyamides;
polycarbonates,
polyimides;
polybenzimidazoles;
polyurethane;
semi-synthetic polymers, such a regenerated cellulose, more particularly those bases on copper acetate;
thermohardening resins, such as epoxy resins and aminoplastics;
copolymers of two or more of the above-mentioned polymers;
polysulphones;
inorganic polymers, such as polyphosphazenes.

According to the invention the heat exchanger also may be built up of hollow bicomponent filaments. According to the invention the hollow filaments may be provided with a coating to improve adhesion. Such hollow filaments may be manufactured in a simple manner if they are made to have a bicomponent construction with an inner ring of the one component and an outer ring of the other component. Further, the walls of the hollow filaments may contain a filler, stabilizers, carbon black, pigments or like additive. In their simplest embodiment the hollow filaments have a substantially circular cross-section. By hollow filaments are generally to be understood here filaments made by a spinning process, such as melt spinning, dry spinning or wet spinning or by an extrusion process or a casting process.

Depending on the requirements to be satisfied, however, they also may have an elliptical, triangular, quadrangular, pentagonal, hexagonal or other polygonal ring-shaped cross-section.

The heat exchanger according to the invention particularly lends itself to being applied in a thermal power system.

Because of its compact construction and low weight the heat exchanger according to the invention may with advantage be used in a motor vehicle, particularly as radiator for cooling the cooling liquid, as recuperator in the exhaust system for recovering energy, as heating element for the interior and the like.

Favourable results are particularly to be expected when the heat exchanger according to the invention is used in a cooling or heat pump system. An example of such a heat pump system is a system in which heat is withdrawn from subsoil water with the aid of three circulation systems in which pumps and heat exchangers are placed and where of the heat exchangers a high efficiency is required, i.e. an efficiency higher than 90%, and preferably higher than 95%.

Also for obtaining high efficiency the heat exchanger according to the invention is with advantage used for exchanging heat between substantially gaseous fluids.

To save energy in the heating and conditioning of buildings the heat exchanger according to the invention is with advantage used in a system for the recovery of heat from ventilation air. The apparatus according to the invention also may with advantage be used in a cooling tower of the dry type or in a system for the storage of heat. The heat exchanger according to the invention also may very well be applied in a system for taking in solar energy, more particularly from a solar collector.

The invention is further described with reference to the accompanying schematic drawing.

Figure 1:
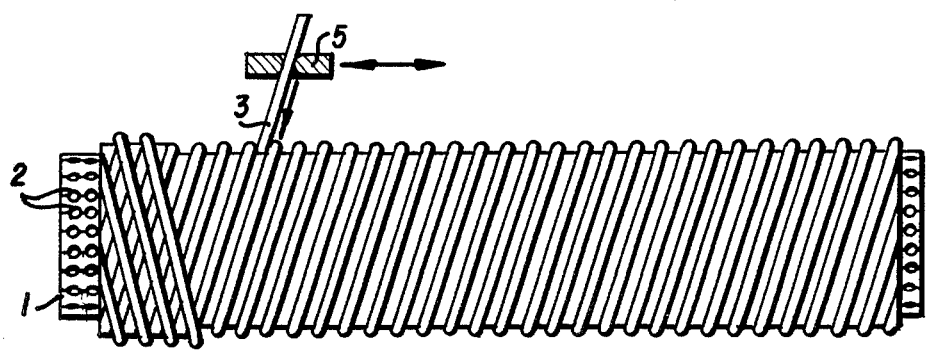
FIGS. 1, 2 and 3 illustrate methods of manufacturing the basic body of a heat exchanger.
Figure 2:
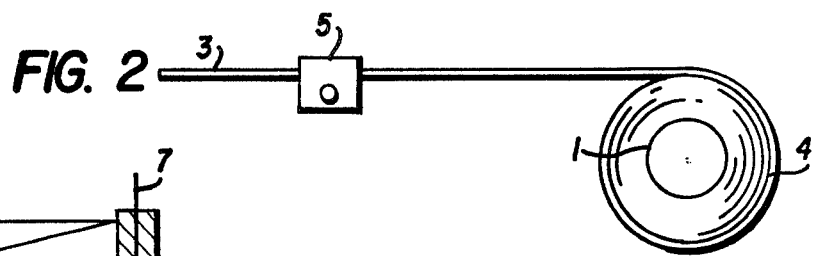
Figure 3:
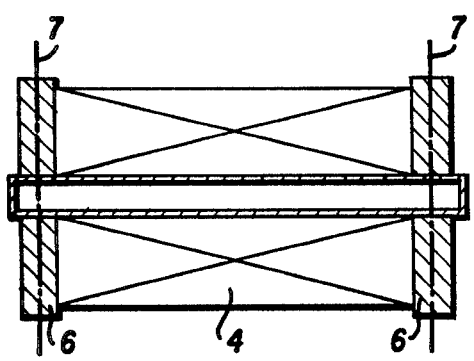

FIGS. 1 and 2 show a reel 1 provided with perforations 2 and on which a hollow filament 3 is wound into a package 4 with the aid of a traverse element 5 moving in axial direction of the reel. At its heads the package 4 shown in FIG. 3 is provided with two flanges 6 of casting resin. After the casting resin has set, these flanges are cut through along the lines 7. From the basic block thus obtained the heat exchangers according to FIGS. 4, 5, 6 and 7 are made.

Figure 4:
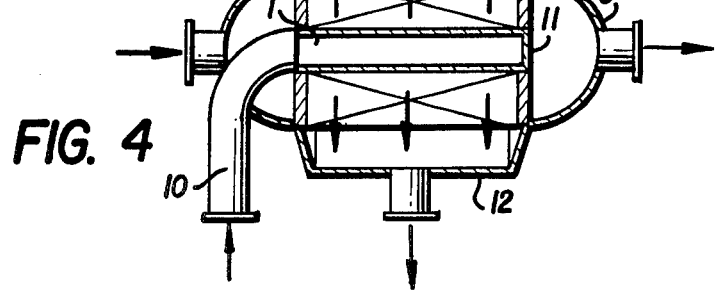
FIGS. 4, 5, 6 and 7 show various embodiments of a heat exchanger according to the invention.

With the heat exchanger according to FIG. 4 a first medium is fed to a compartment 8 at the one head of the filament package 4. The first medium subsequently flows through the inside of the wound hollow filaments to the other head of the package and ends in a compartment 9 from which it is discharged, the directions of flow being indicated by the arrows. The second medium is fed through the supply conduit 10 into the core of the perforated reel 1, which is at its other end closed off by a wall. The second medium in the core of the reel subsequently flows radially outwards through the perforations 2 in the surface of the reel towards a jacket 12 provided with an outflow for the discharge of the second medium in the direction indicated by the arrow. So in the heat exchanger according to FIG. 4 the first medium flows through the hollow filaments and the second medium flows around the hollow filaments. The first medium can be supplied in the hot state and the second medium in the cold state, or inversely. The synthetic filaments forming a large number of thin-walled hollow channels, a very effective heat exchanger is obtained.

Figure 5:
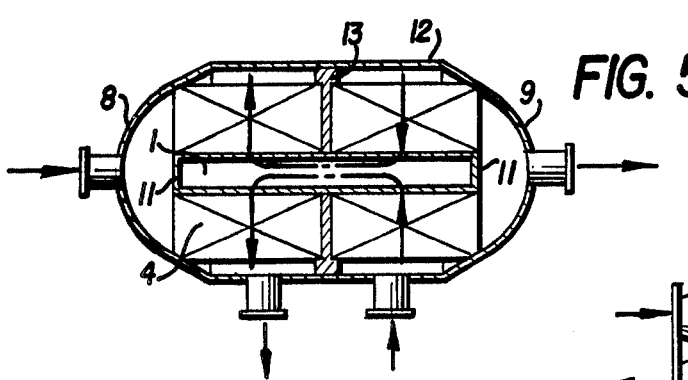

The heat exchanger given in FIG. 5 differs from the one according to FIG. 4 in that the jacket 12 and the space between the hollow filaments in the package is divided into two halves by a partition 13. Further, the two heads of the reel are closed off by a wall 11. The first medium is again passed via the compartment 8 through the hollow filaments of the package 4 and leaves the device through the compartment 9 at the discharge end. The second medium is fed into the one half of the jacket 12 and flows in approximately radial direction towards the core of the reel 1. Subsequently, the second medium flows in the direction indicated by the arrow from the core of the reel radially outwards through the package to the other half of the jacket 12 which it leaves by an outflow opening.

Figure 6:
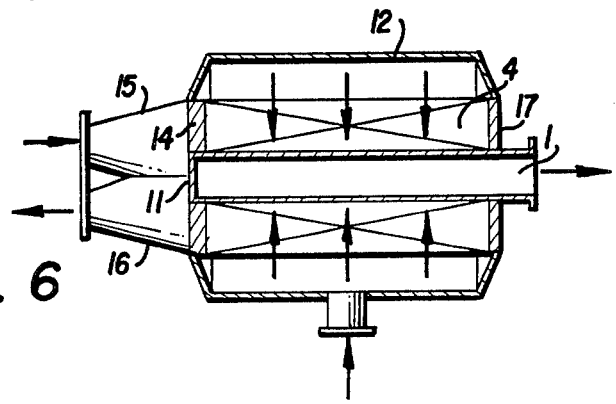

FIG. 6 shows an embodiment in which the hollow filaments of the package 4 are severed and opened only at the one head 14 and the access to these opened hollow filaments is divided into two halves, respectively comprising an inlet 15 and an outlet 16 for a first medium. At the other head 17 of the package 4 the filaments were not opened by severing the package. Around the package 4 there is again a jacket 12. Whereas the preforated reel 1 is closed off at one head by a wall 11, it is open at its opposite end face. The first medium may be supplied through the inlet 15 and flows through loop-forming hollow filaments from the package to the outlet 16.

The second medium flows through the inlet opening in the jacket 12 in radial direction through the package 4 around the hollow filaments to the core of the reel 1 and leaves it at its open end.

Figure 7:
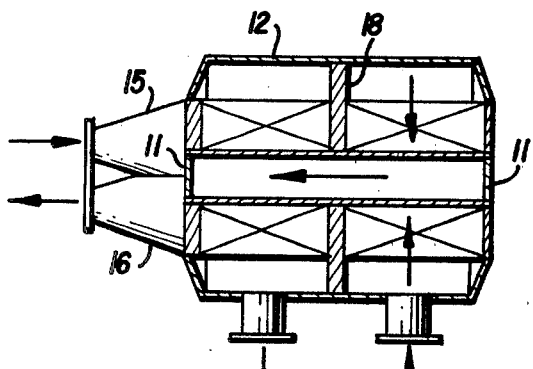
Figure 8:
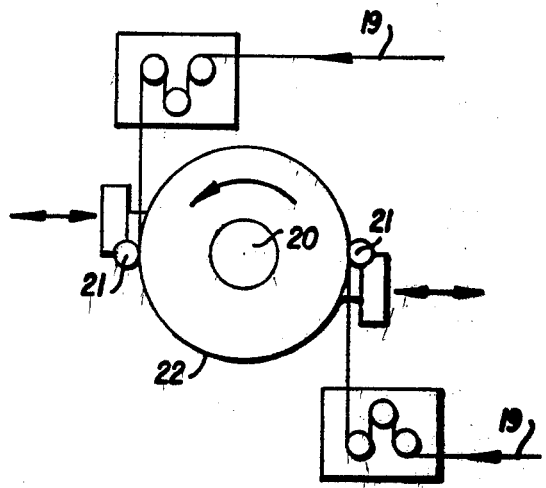
FIGS. 8 and 9 show a method of manufacturing a heat exchanger according to FIG. 10.
Figure 9:
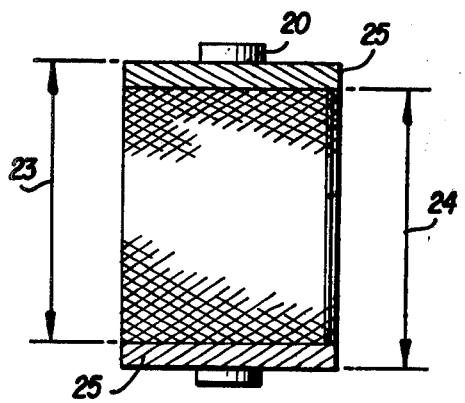
Figure 10:
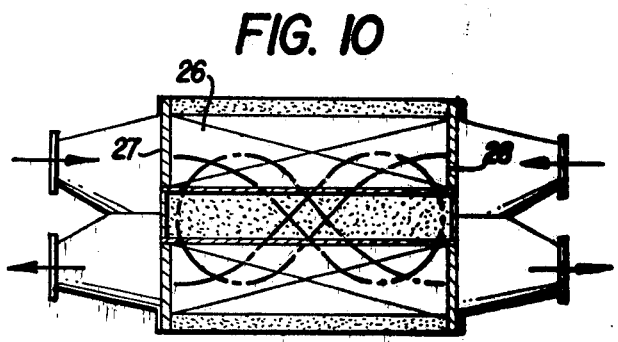
FIG. 10 shows a somewhat varied embodiment of the heat exchanger according to the invention.

FIG. 7 shows an embodiment which differs from the one in FIG. 6 in that the package and the jacket 12 are divided into two halves by means of a partition 18, with the reel 1 being closed off at the two ends by walls 11. The jacket 12 has in its one half an inflow opening and in its other half an outflow opening. FIGS. 8–10 relate to a heat exchanger of a type in which the two media flow through the inside of hollow filaments. As appears from FIGS. 8 and 9, two hollow filaments 19 are fed to a rotating reel 20 in the directions indicated by the arrows and wound into a package 22 by means of traverse elements 21. The strokes of the two traverse elements extend over somewhat staggered regions. Consequently, at the ends of the package 22 there will form zones 25 which each contain only one of the two hollow filaments 19. After completion of the winding process the package 22 is impregnated with resin. After the resin has hardened, the two end zones 25 are cut off. Removing the end zones 25 leaves a package 26 which is at its one end 27 provided with inflow and outflow openings for a second medium. The flow of the two media is schematically indicated by arrows and lines. The package 26 is provided with a satisfactorily thermally insulating sheath.

Figure 11:
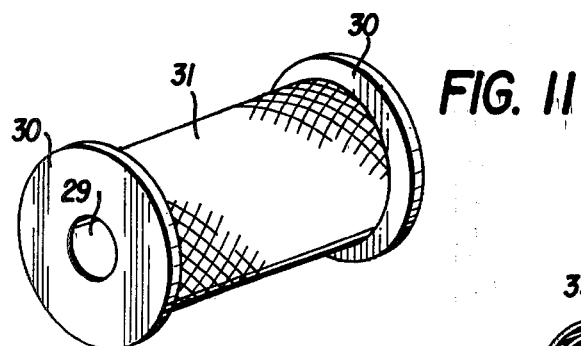
FIGS. 11, 12, 13, 14 and 15 illustrate several variant embodiments of the basic body of the heat exchanger.

FIG. 11 shows a package 31 wound on a reel 29 provided with flanges 30, and the reel, the package and the flanges having an elliptical cross-sectional shape. Such a form of package too can be used in the manufacture of a heat exchanger on the basis of hollow synthetic filaments according to the invention.

Figure 12:
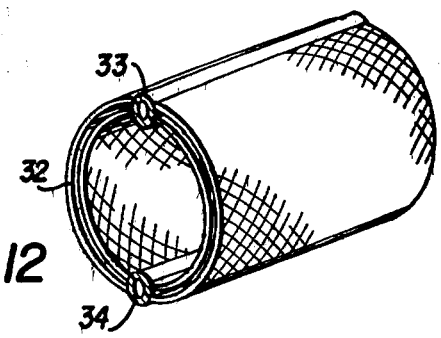
Figure 13:
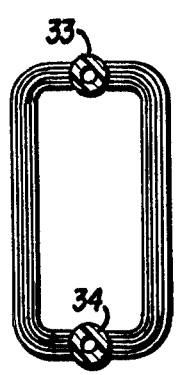
Figure 14:
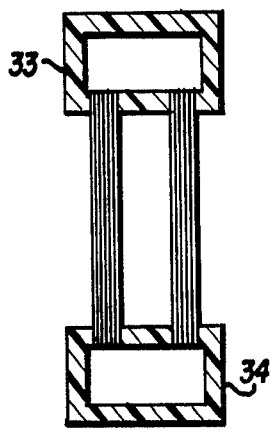
Figure 15:
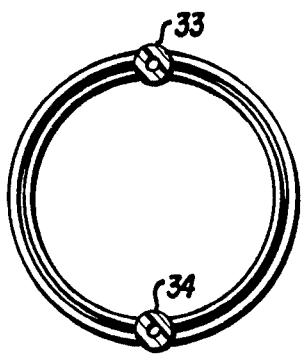
Figure 16:
FIGS. 16–24 show various cross-sections for the hollow filaments to be used.
Figure 17:
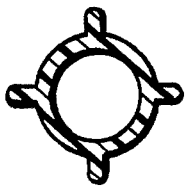
Figure 18:
Figure 19:
Figure 20:
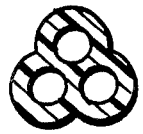
Figure 21:
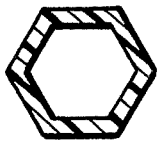
Figure 22:
Figure 23:
Figure 24:
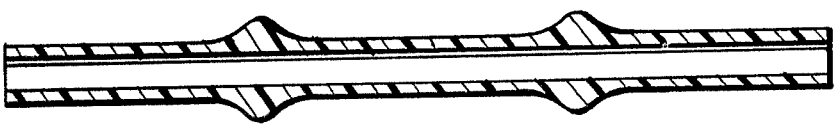

FIG. 12 very schematically shows that a package 32 of hollow filaments need not only be cast in and cut through at the end faces, but also may be cast in and cut through along one or more generating lines. In the embodiment according to FIG. 12 the hollow filaments end in two cast resin tubes 33 and 34, which serve as distributing or collecting space for the medium flowing through the hollow filaments. FIGS. 13, 14 and 15 show somewhat varied embodiments, which differ from the one in FIG. 12 only as far as shaping is concerned. FIGS. 13 and 14 illustrate a substantially rectangular ring-shaped cross-section.

FIG. 15 shows a circular ring cross-section.

FIGS. 16, 17, 18, 19, 20, 21, 22, 23 and 24 show various optional cross-sectional shapes of hollow synthetic filaments. The cross-sectional shape may with advantage be chosen in accordance with prevailing circumstances.

Figure 25:
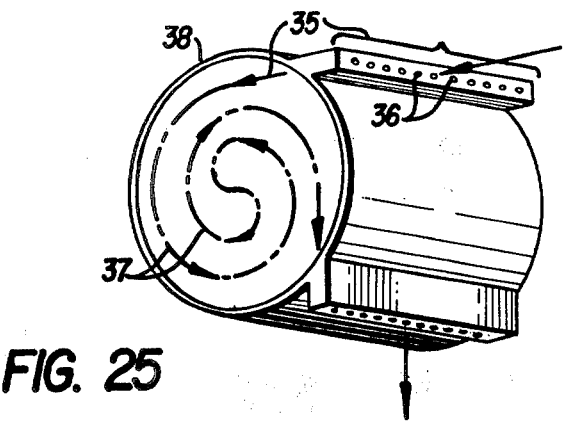
FIGS. 25 and 26 show a few other variant embodiments of the heat exchanger according to the invention.

FIG. 25 shows a heat exchanger in which a group of hollow synthetic filaments 36 forming a layer 35 extend along a spiral 37 successively from the outside inwardly and from the inside outwardly. Such a flat spiral-shaped group of filaments is accomodated in a housing 38. A first medium can flow in the directions indicated by the arrows through each of the hollow filaments in the group.

Figure 26:
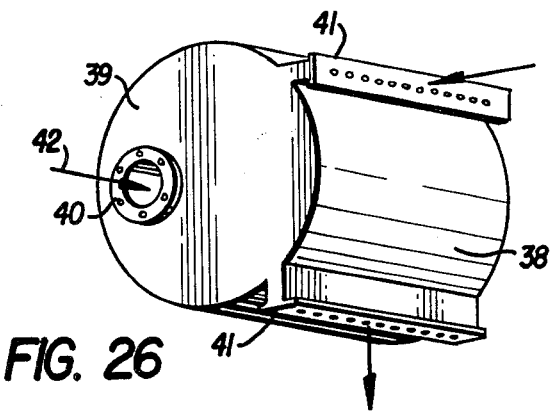

FIG. 26 shows the heat exchanger according to FIG. 25, the housing 38 being provided with an inlet piece 39 with a connecting flange 40, and the inlet and the outlet for the group of hollow filaments being provided with connecting flanges 41.

A second medium is supplied in the direction indicated by the arrow 42. So with this type of heat exchanger the first medium is in the hollow filaments and the second medium flows externally of the hollow filaments. However, also other embodiments of this type of heat exchanger may be applied. For instance, use may be made of two layers of hollow filaments, which layers run spirally and are bonded to each other.

Figure 27:
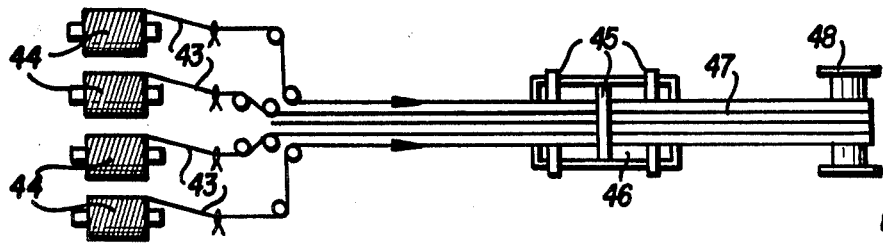
FIGS. 27, 28 and 29 show a few methods of manufacturing the heat exchanger according to the invention.
Figure 28:
Figure 29:
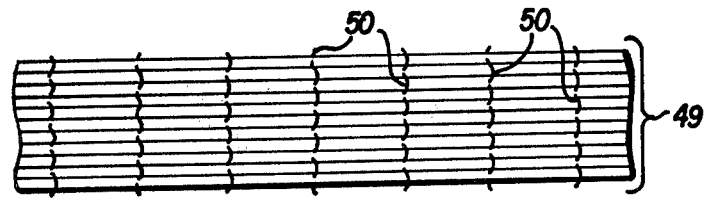

FIGS. 27 and 28 show a method of making a layer or group of parallel hollow filaments which can be used as starting layer for the spirally shaped layer of filaments in the heat exchanger according to FIG. 25. The hollow filaments 43 are drawn off then from supply packages 44 of hollow nylon or polyester filaments obtained for instance by meltspinning. The hollow filaments 43 are suitably guided to run parallel to each other and over guide rolls 45 through a bath 46 of a molten impregnating agent. After the filaments have left the bath, the impregnating agent, for instance a synthetic resin, will solidify, after which the sheet 49 of parallel hollow filaments 43 is wound onto a reel 48. The sheet of filaments 47 thus obtained can be cut into groups of layer-forming parallel hollow filaments which can be formed into the above-described spiral. Of course, a far larger number of supply packages 44 may be used than indicated in FIG. 27. For increased coherence a sheet 49 of parallel hollow filaments may at certain intervals be provided with a transverse connecting thread 50, as is shown in FIG. 29.

It should be added that Australian Patent Specification 421 606 also describes a device comprising hollow, helical filaments. In this known device, however, the hollow filaments are permeable and for that reason different uses are proposed for it, more particularly the separation of substances via the permeable wall of the hollow filaments.

U.S. Pat. No. 3,863,712 describes an apparatus for exchanging heat between two fluids. One of the fluids flows through hollow filaments having an outer diameter of about 2.5 to 6.3 mm. The hollow filaments are formed into small groups which are braided together in such a way that they form a hairpin-like tube.

French Patent Specification No. 2 329 962 describes a heat exchanger in which a number of tubes extend parallel to each other in the form of a spiral.

U.S. Pat. No. 3,616,022 relates to a process for manufacturing components for heat exchangers comprising synthetic hollow filaments. With the heat exchangers shown in this patent specification the hollow filaments extend substantially rectilinearly in their longitudinal direction.

German Patent Specification No. 2 414 663 shows a heat exchanger comprising a rotor provided with a large number of conduits extending parallel to the axis of the rotor. These conduits may be formed from various materials, such as cellulose acetate, polyamide, polycarbonate and the like.

German Patent Specification No. 1 601 185 describes a heat exchanger consisting of a bundle of substantially parallel capillary conduits. These conduits may be formed from a synthetic organic material to which one or more layers of a different material may be applied.

French Patent Specification No. 2 339 820 mentions the use in general of hollow synthetic filaments for a solar collector. The hollow filaments are not present then in the form of a helix or spiral. French Patent Specification No. 1 403 239 and U.S. Pat. No. 3,772,896 describes a heat exchanger in which one of the two fluids is passed through a spirally shaped channel.

The Netherlands Patent Specification No. 7 407 020 relates to components for a heat exchanger which are made from films instead of from hollow filaments.

The Netherlands Patent Specification No. 6 514 170 relates to a heat exchanger of hollow synthetic filaments which extend substantially rectilinearly.

German Patent Specification No. 1 602 253 relates to a heat exchanger consisting of tubes having a small wall thickness and a small diameter, the tubes being wound on a drum in several layers. Apparently, the tubes are of metal. Within the scope of the invention various modifications may be made.

What is claimed is:

1. An apparatus for exchanging heat between two fluids comprising a tubular core member with a fluid-permeable tube wall and hollow polymer filaments having an outer diameter of 0.05 to 5 mm and a wall thickness of 5 to 20 percent of the outer diameter, means for flowing a first fluid through the core member and its permeable tube wall, said hollow filaments extending in the form of a helix in a plurality of more than two layers wound upon each other with the hollow filaments of each layer multiply crossing the hollow filaments of the next layers and the innermost layer of the hollow filaments being wound on the core, and means for flowing a second fluid through the hollow filaments.

2. The heat exchange apparatus of claim 1, in which the hollow polymer filaments have an outer diameter of 0.05 to 1 mm.

3. The heat exchange apparatus of claim 1, wherein the polymer is a polyolefin, polystyrene, a copolymer of styrene and butadiene, acrylonitrile and acrylate ester, a polyhaloolefin, polyvinyl alcohol, polyvinyl acetate, a polyacrylate, a synthetic elastomer, natural rubber, a polyoxide, a polyester, a polyamide, a polycarbonate, a polyimide, polybenzimidazole, polyurethane, a regenerated cellulose, an epoxy resin, an amino plastic, a polysulfone, or an inorganic polymer.

4. The heat exchange apparatus of claim 1, installed in a motor vehicle as a radiator.

5. The apparatus of claim 1, installed in a heat pump system.

* * * * *